United States Patent
Ankireddypalle et al.

(10) Patent No.: US 10,268,402 B2
(45) Date of Patent: *Apr. 23, 2019

(54) SHARED NETWORK-AVAILABLE STORAGE THAT PERMITS CONCURRENT DATA ACCESS

(71) Applicant: Commvault Systems, Inc., Tinton Falls, NJ (US)

(72) Inventors: Ramachandra Reddy Ankireddypalle, Eatontown, NJ (US); Manoj Kumar Vijayan, Marlboro, NJ (US); Rajiv Kottomtharayil, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,809

(22) Filed: Mar. 28, 2017

(65) Prior Publication Data

US 2017/0199688 A1    Jul. 13, 2017

Related U.S. Application Data

(63) Continuation of application No. 13/792,544, filed on Mar. 11, 2013, now Pat. No. 9,639,297.
(Continued)

(51) Int. Cl.
*H04L 29/08*        (2006.01)
*G06F 3/06*         (2006.01)

(52) U.S. Cl.
CPC .......... *G06F 3/0619* (2013.01); *G06F 3/0604* (2013.01); *G06F 3/065* (2013.01);
(Continued)

(58) Field of Classification Search
CPC ....... G06F 3/0619; G06F 3/0604; G06F 3/067
(Continued)

(56) References Cited

U.S. PATENT DOCUMENTS

| 4,686,620 A | 8/1987 | Ng |
| 4,995,035 A | 2/1991 | Cole et al. |

(Continued)

FOREIGN PATENT DOCUMENTS

| EP | 0259912 A1 | 3/1988 |
| EP | 0405926 A2 | 1/1991 |

(Continued)

OTHER PUBLICATIONS

Armstead et al., "Implementation of a Campwide Distributed Mass Storage Service: The Dream vs. Reality," IEEE, Sep. 11-14, 1995, pp. 190-199.

(Continued)

*Primary Examiner* — Glenford J Madamba
(74) *Attorney, Agent, or Firm* — Perkins Coie LLP

(57) ABSTRACT

Techniques for providing shared access to, e.g., a small computer system interface (SCSI) storage device in a computer network include providing an operational mode on SCSI interfaces with a first media agent and a second media agent such that, in response to inquiry messages on the SCSI interfaces, the SCSI storage device appears as a SCSI target device to the first media agent and the second media agent and mapping data operations between the first media agent and the SCSI storage device and the second media agent and the SCSI storage device to logically unique channel numbers for the first media agent and the second media agent to perform data storage operations over their respective SCSI interfaces by concurrently sharing the SCSI storage device.

18 Claims, 12 Drawing Sheets

Related U.S. Application Data

(60) Provisional application No. 61/617,929, filed on Mar. 30, 2012.

(52) U.S. Cl.
CPC ............ *G06F 3/067* (2013.01); *G06F 3/0635* (2013.01); *H04L 67/1097* (2013.01)

(58) Field of Classification Search
USPC ....................................................... 709/213
See application file for complete search history.

(56) References Cited

U.S. PATENT DOCUMENTS

| | | | |
|---|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,247,660 A | 9/1993 | Ashcraft et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,465,354 A | 11/1995 | Hirosawa et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,594,889 A | 1/1997 | Colgate et al. |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,822,758 A | 10/1998 | Loper et al. |
| 5,875,478 A | 2/1999 | Blumenau |
| 5,887,134 A | 3/1999 | Ebrahim |
| 5,901,327 A | 5/1999 | Ofek |
| 5,909,594 A | 6/1999 | Ross et al. |
| 5,924,102 A | 7/1999 | Perks |
| 5,938,734 A | 8/1999 | Yao et al. |
| 5,950,205 A | 9/1999 | Aviani, Jr. |
| 5,974,563 A | 10/1999 | Beeler, Jr. |
| 5,987,506 A | 11/1999 | Carter et al. |
| 6,021,415 A | 2/2000 | Cannon et al. |
| 6,026,414 A | 2/2000 | Anglin |
| 6,052,735 A | 4/2000 | Ulrich et al. |
| 6,070,228 A | 5/2000 | Belknap et al. |
| 6,076,148 A | 6/2000 | Kedem |
| 6,088,745 A | 7/2000 | Bertagna et al. |
| 6,094,416 A | 7/2000 | Ying |
| 6,131,095 A | 10/2000 | Low et al. |
| 6,131,190 A | 10/2000 | Sidwell |
| 6,134,482 A | 10/2000 | Iwasaki |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,211,869 B1 | 4/2001 | Loveman et al. |
| 6,212,512 B1 | 4/2001 | Barney et al. |
| 6,243,824 B1 | 6/2001 | Kakuta et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,349,312 B1 | 2/2002 | Fresko et al. |
| RE37,601 E | 3/2002 | Eastridge et al. |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,505,216 B1 | 1/2003 | Schutzman et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,553,369 B1 | 4/2003 | Guay et al. |
| 6,557,052 B1 | 4/2003 | Kubo |
| 6,564,228 B1 | 5/2003 | O'Connor |
| 6,587,431 B1 | 7/2003 | Almulhem et al. |
| 6,647,472 B2 | 11/2003 | Atkinson et al. |
| 6,658,526 B2 | 12/2003 | Nguyen et al. |
| 6,691,136 B2 | 2/2004 | Lee et al. |
| 6,745,311 B2 | 6/2004 | Fabrizio et al. |
| 6,760,765 B1 | 7/2004 | Asai et al. |
| 6,760,808 B2 | 7/2004 | Peters et al. |
| 6,952,828 B2 | 10/2005 | Greene |
| 6,981,260 B2 | 12/2005 | Brenner et al. |
| 6,993,767 B2 | 1/2006 | Brenner et al. |
| 7,010,626 B2 | 3/2006 | Kahle |
| 7,047,309 B2 | 5/2006 | Baumann et al. |
| 7,051,053 B2 | 5/2006 | Sinha |
| 7,069,354 B2 | 6/2006 | Pooni et al. |
| 7,111,115 B2 | 9/2006 | Peters et al. |
| 7,159,072 B2 | 1/2007 | Kitamura |
| 7,161,907 B2 | 1/2007 | Mott |
| 7,161,994 B2 | 1/2007 | Shah et al. |
| 7,177,913 B2 | 2/2007 | Connor |
| 7,177,992 B2 | 2/2007 | Kappler |
| 7,188,367 B1 | 3/2007 | Edwards et al. |
| 7,238,218 B2 | 7/2007 | Hepner et al. |
| 7,251,691 B2 | 7/2007 | Boyd et al. |
| 7,287,133 B2 | 10/2007 | Rowan et al. |
| 7,403,987 B1* | 7/2008 | Marinelli ............ H04L 43/0817 |
| | | 707/999.202 |
| 7,406,473 B1 | 7/2008 | Brassow et al. |
| 7,409,522 B1 | 8/2008 | Fair et al. |
| 7,421,710 B2 | 9/2008 | Qi et al. |
| 7,460,149 B1 | 12/2008 | Donovan et al. |
| 7,475,210 B2 | 1/2009 | Yamada |
| 7,487,309 B2 | 2/2009 | Peters et al. |
| 7,499,715 B2 | 3/2009 | Carro et al. |
| 7,519,769 B1* | 4/2009 | Kulkarni ............... G06F 3/0607 |
| | | 711/114 |
| 7,562,362 B1 | 7/2009 | Paquette et al. |
| 7,606,967 B2 | 10/2009 | Konno |
| 7,631,076 B2 | 12/2009 | Cannon et al. |
| 7,757,013 B1 | 7/2010 | Lawson et al. |
| 7,793,000 B2 | 9/2010 | Rosenau |
| 7,818,530 B2 | 10/2010 | Gold et al. |
| 7,831,766 B2 | 11/2010 | Gokhale et al. |
| 7,843,907 B1 | 11/2010 | Abou-Emara et al. |
| 7,873,153 B2 | 1/2011 | Bukovec et al. |
| 7,873,700 B2 | 1/2011 | Pawlowski et al. |
| 7,877,558 B2 | 1/2011 | Hughes et al. |
| 7,940,756 B1 | 5/2011 | Duffy et al. |
| 7,958,507 B2 | 6/2011 | Santos et al. |
| 7,975,061 B1 | 7/2011 | Gokhale et al. |
| 7,996,458 B2 | 8/2011 | Nielsen et al. |
| 8,000,346 B2 | 8/2011 | Yong et al. |

(56) References Cited

U.S. PATENT DOCUMENTS

| | | |
|---|---|---|
| 8,046,558 B2 | 10/2011 | Ghose |
| 8,141,078 B2 | 3/2012 | Abernethy, Jr. et al. |
| 8,205,205 B2 | 6/2012 | Franke |
| 8,402,322 B2 | 3/2013 | Herz et al. |
| 8,438,346 B2 | 5/2013 | Gold |
| 8,468,538 B2 | 6/2013 | Attarde et al. |
| 8,832,706 B2 | 9/2014 | Gokhale et al. |
| 9,063,938 B2 | 6/2015 | Kumarasamy et al. |
| 9,256,606 B2 | 2/2016 | Attarde et al. |
| 9,367,548 B2 | 6/2016 | Kumarasamy et al. |
| 9,535,776 B2 | 1/2017 | Klose |
| 9,639,297 B2 | 5/2017 | Ankireddypalle et al. |
| 9,773,002 B2 | 9/2017 | Kumarasamy et al. |
| 2009/0193113 A1* | 7/2009 | Lunde .................. G06F 9/5072 709/224 |
| 2010/0332401 A1* | 12/2010 | Prahlad ............ G06F 17/30082 705/80 |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, Jun. 12-16, 1994, pp. 124-126.

Gait, J., "The Optical File Cabinet: A Random-Access File System for Write-Once Optical Disks," *IEEE Computer*, vol. 21, No. 6, pp. 11-22 (Jun. 1988).

Jander, M., "Launching Storage-Area Net," *Data Communications*, US, McGraw Hill, NY, vol. 27, No. 4 (Mar. 21, 1998), pp. 64-72.

Rosenblum et al., "The Design and Implementation of a Log-Structured File System," *Operating Systems Review SIGOPS*, vol. 25, No. 5, New York, US, pp. 1-15 (May 1991).

\* cited by examiner

900

| Channel Number | Media Agent | Virtual disk exported by Shared SAN SERVER | LBA Number on Virtual Disk |
|---|---|---|---|
| 1 | Media Agent1 | Virtual Disk#1 | 2048 |
| 2 | Media Agent1 | Virtual Disk#1 | 2049 |
| 3 | Media Agent1 | Virtual Disk#1 | 2064 |
| 4 | Media Agent2 | Virtual Disk#2 | 2048 |
| 5 | Media Agent2 | Virtual Disk#2 | 2063 |
| 6 | Media Agent3 | Virtual Disk#3 | 2048 |
| 7 | Media Agent3 | Virtual Disk#2 | 2063 |

*FIG. 9*

SHARED NETWORK-AVAILABLE STORAGE THAT PERMITS CONCURRENT DATA ACCESS

CROSS-REFERENCE TO RELATED APPLICATIONS

The present application is a continuation of U.S. application Ser. No. 13/792,544, entitled "SHARED NETWORK-AVAILABLE STORAGE THAT PERMITS CONCURRENT DATA ACCESS," filed on Mar. 11, 2013 (U.S. Pat. No. 9,639,297), which claims the benefit of priority under 35 U.S.C. § 119(e) from U.S. Provisional Patent 61/617,929, entitled "SHARED NETWORK-AVAILABLE STORAGE THAT PERMITS CONCURRENT DATA ACCESS," filed on Mar. 30, 2012, each of which is hereby incorporated by reference in their entireties.

BACKGROUND

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example, to prevent loss of data in the event a problem occurred with the data stored in primary storage.

To protect primary copy data or for other purposes, such as regulatory compliance, secondary copies (alternatively referred to as "data protection copies") can be made. Examples of secondary copies include a backup copy, a snapshot copy, a hierarchical storage management ("HSM") copy, an archive copy, and other types of copies.

A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at an offsite location.

After an initial, full backup of a data set is performed, periodic, intermittent, or continuous incremental backup operations may be subsequently performed on the data set. Each incremental backup operation copies only the primary copy data that has changed since the last full or incremental backup of the data set was performed. In this way, even if the entire set of primary copy data that is backed up is large, the amount of data that must be transferred during each incremental backup operation may be significantly smaller, since only the changed data needs to be transferred to secondary storage. Combined, one or more full backup and subsequent incremental copies may be utilized together to periodically or intermittently create a synthetic full backup copy. More details regarding synthetic storage operations are found in commonly-assigned U.S. patent application Ser. No. 12/510,059, entitled "Snapshot Storage and Management System with Indexing and User Interface," filed Jul. 27, 2009, now U.S. Pat. No. 7,873,806, which is hereby incorporated by reference herein in its entirety.

An archive copy is generally a copy of the primary copy data, but typically includes only a subset of the primary copy data that meets certain criteria and is usually stored in a format other than the native application format. For example, an archive copy might include only that data from the primary copy that is larger than a given size threshold or older than a given age threshold and that is stored in a backup format. Often, archive data is removed from the primary copy, and a stub is stored in the primary copy to indicate its new location. When a user requests access to the archive data that has been removed or migrated, systems use the stub to locate the data and often make recovery of the data appear transparent, even though the archive data may be stored at a location different from the remaining primary copy data.

Archive copies are typically created and tracked independently of other secondary copies, such as other backup copies. For example, to create a backup copy, the data storage system transfers a secondary copy of primary copy data to secondary storage and tracks the backup copy using a backup index separate from the archive index. To create an archive copy, a conventional data storage system transfers the primary copy data to be archived to secondary storage to create an archive copy, replaces the primary copy data with a link or stub, and tracks the archive copy using an archive index. Accordingly, the data storage system will transfer two separate times to secondary storage a primary copy data object that is both archived and backed-up.

Since each transfer consumes network and computing resources, the data storage system may not be able to devote such resources to other tasks. Moreover, the data storage system is required to devote resources to maintaining each separate index. In some cases, the archive index may be unaware of the other secondary copy and the other secondary index may be unaware of the archive copy, which may lead to further inefficiencies. Moreover, in some cases, in the event that an archive copy is moved or transferred (e.g., to another tier of secondary storage), the archive index may not be able to be updated to reflect the move or transfer. In such cases, the data storage system may be unable to use the stub to locate the archived data object.

To be able to store and retrieve the above-described various versions of data (primary, secondary, archive, etc.) a computer device needs to access a storage device. In many computer networks, e.g., a corporate network, it may be beneficial to couple a storage device to the network such that the storage device is accessible to computers coupled to the network. In current systems, data traffic to or from such multiple client computers may flow on a local area network (LAN). In addition, in current computer networks, storage devices that use specialized data interfaces such as a fibre channel or small computer system interface (SCSI) cannot be shared by multiple clients.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

BRIEF DESCRIPTION OF THE DRAWINGS

FIG. 9 is a tabular representation of a storage resource assignment to multiple media agents.

DETAILED DESCRIPTION

Figure 1:
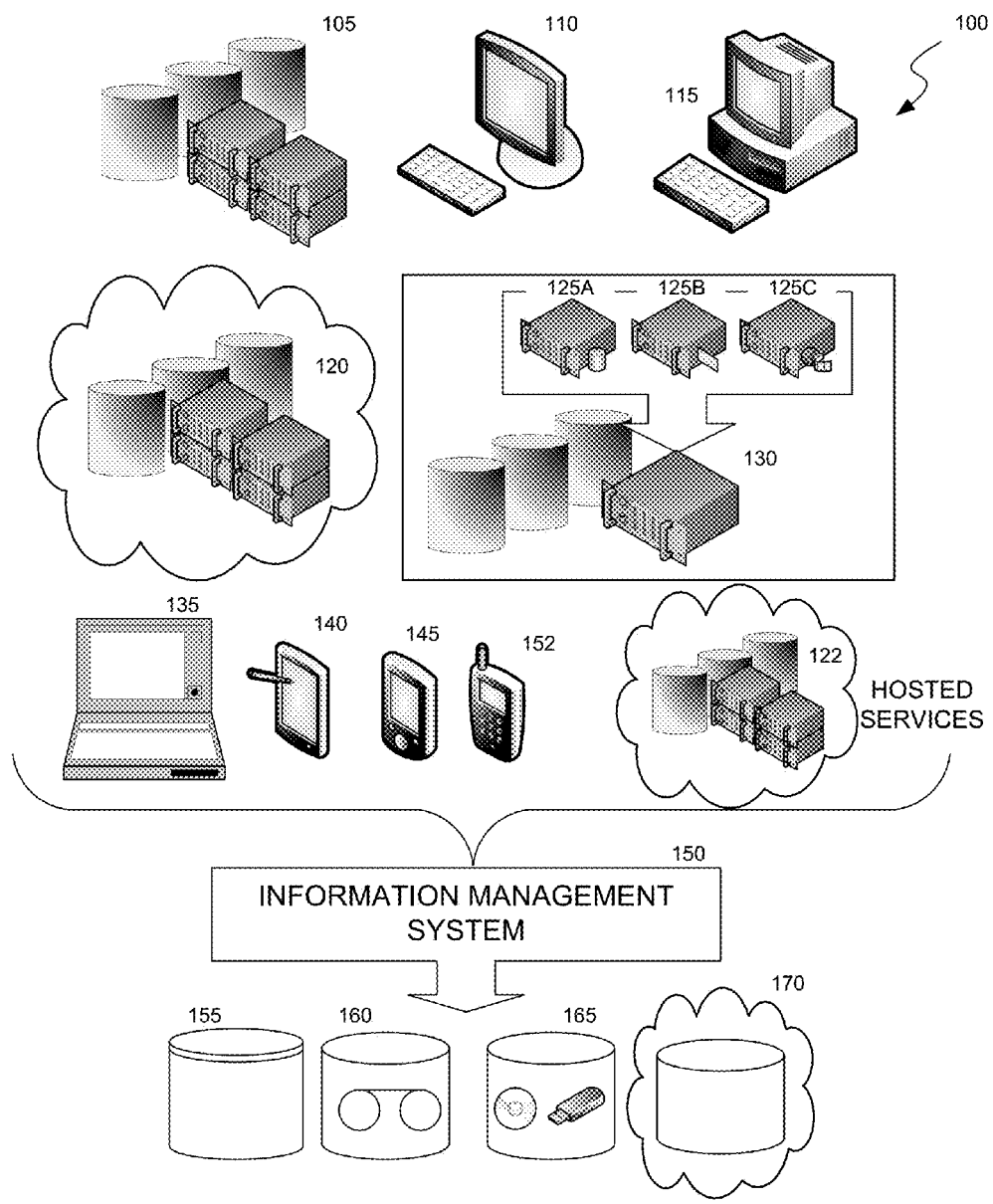
FIG. 1 is a block diagram illustrating an example of a suitable information management environment in which aspects of the inventive system may operate.

The techniques disclosed in this document are useful, in one aspect, in solving the above-discussed problems related to providing shared access to storage devices. In another aspect, the disclosed techniques are useful in off-loading storage related data transfers from local area network to locally attached storage devices. Other benefits are also realized by the system disclosed herein.

The headings provided herein are for convenience only and do not necessarily affect the scope or meaning of the disclosure.

Overview

A software, firmware, and/or hardware system for archiving data objects using secondary copies (the "system") is disclosed. The system creates one or more secondary copies of primary copy data (e.g., production data stored by a production computing system). The primary copy data contains multiple data objects (e.g., multiple files, emails, or other logical groupings or collections of data). The system maintains a first data structure that tracks the data objects for which the system has created secondary copies and the locations of the secondary copies.

To provide shared access to a storage device, the system provides an access media agent, described in greater detail below, which is a media agent adapted to provide other media agents with shared access to a storage device, where each of the media agents in turn are responsible for storage operations for one or more clients. In some implementations, the access media agent is adapted to look like a target device for storage operations. The access media agent may communicate with other media agents over a dedicated data channel such as a small computer system interface (SCSI), a parallel SCSI interface, a serial attached SCSI (SAS) interface, a Fibre Channel interface, an ATA interface, an Integrated Development Environment (IDE) interface, etc. In one aspect, the use of such dedicated interfaces offloads storage data traffic between media agents and a storage device from a local area network (LAN) that may be used for communication.

In some computer networks, multiple servers may be simultaneously performing data archival/restoration operations. For example, one server may be an Oracle server, another could be a SQL server, a third one could be an Exchange database, which may be transferring data to storage, typically using media agents (described below) and transferring data over a local area network. In the past, each of these individual media agents had corresponding disk storage for backup. However, with the advent of storage area network (SAN) based storage it may be possible to "share" the storage capacity between the various servers. For example, Oracle server may be in a need for additional 2 Tbytes of storage, which may not be locally available, but because the Exchange server is under-utilizing its local storage capacity, 2 Terabytes may be available at the Exchange server storage. However, if the storage is local, it cannot be shared by another serer in the network. Therefore, such localized resourcing of storage leads to frequent addition of storage capacity at one server (and associated provisioning), while excess capacity may be available at another server. Such provisioning may take away time from already busy system administrators. The techniques presented in this document, in one aspect, relieve a system administrator of having to perform such "unnecessary" provisioning when storage is available in the network by centralizing storage and allowing various servers to share the storage concurrently through a storage server.

As further described below, a storage server advantageously hides the working details of data block management on the storage device from each application server that utilizes the storage. Furthermore, application servers do not end up over-writing each other because the storage server exposes the storage simply as Logical Unit Numbers (LUNs) to each application server. Therefore, from each application server's perspective, data read/write operations can be performed when desired, with the concurrency of multiple applications being achieved by arbitration performed by the storage server.

In one advantageous aspect, storage efficiency can be increased by sharing deduplication operation across multiple application servers. For example, a data block written to the storage by one media agent for one application server may be available for reading by another media agent (controlled by the storage server). The storage server, e.g., offers simultaneous access to the same data block by all media agents attempting to read the block.

Various examples will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

While the embodiments described below generally refer to Linux-based implementations, applicability of the disclosed techniques to other operating system (OS) frameworks, such as various OSs from vendors such as Microsoft, Apple and Sun (now Oracle) will be appreciated and understood by one of skill in the art. Furthermore, while the embodiments are described using the use of Fibre Channel and Small Computer System Interface (SCSI) transport protocol examples, the applicability to other data bus technologies would be appreciated by one of skill in the art. Therefore, the term "SCSI" as used herein encompasses other industry standards such as iSCSI, SAS, IDE, etc.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Aspects of the technologies described herein may be practiced in an information management environment 100, which will now be described while referencing FIG. 1. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPs), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Patent Publication Number 2010/0332456, which is hereby incorporated by reference herein in its entirety.

Figure 2:
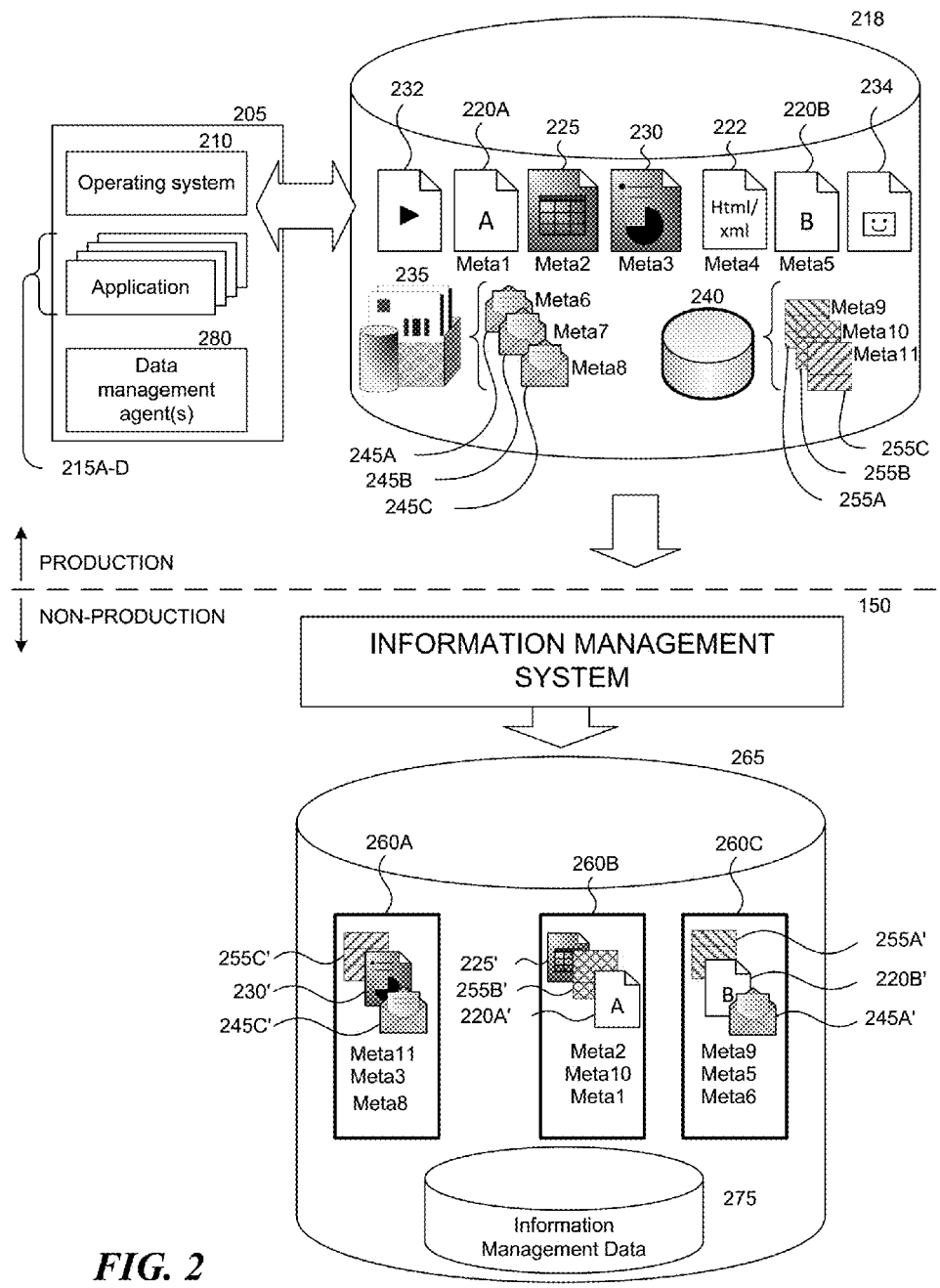
FIG. 2 illustrates examples of production and non-production data that may be processed by the information management environment of FIG. 1.

FIG. 2 helps illustrates some differences between "production copies" of data and metadata and "non-production copies" of data and metadata in the data management environment 100. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 234, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments. As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified. Third, non-production objects are often stored on a non-production storage medium 265 that is inaccessible to the applications 215A-D running on computing devices and hosted services 122. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, that permit the information management system to perform its various information management tasks. As shown in FIG. 2, a computing device 205 may include one or more data management agents 280 that provide client-side functions for the information management system.

Information Management System

Figure 3:
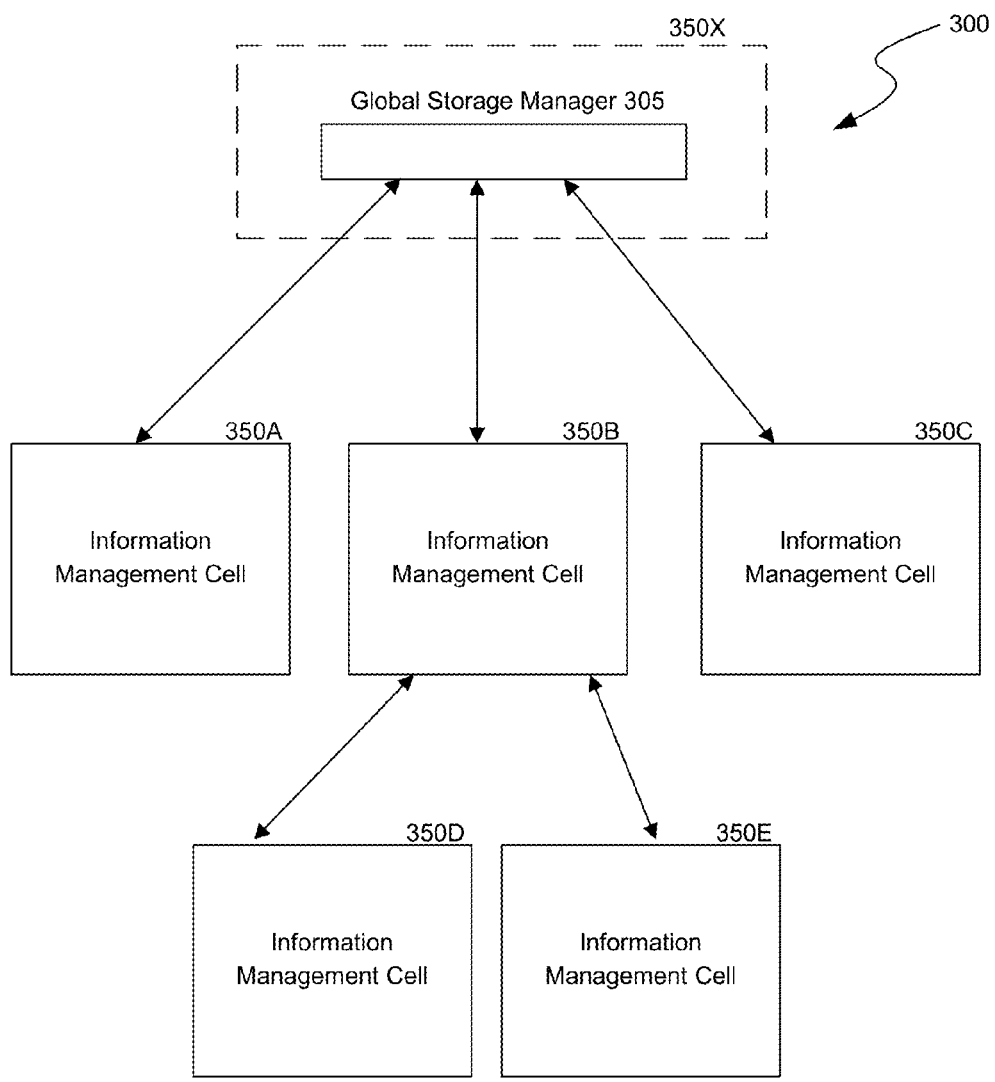
FIG. 3 is a block diagram illustrating one example of a hierarchical arrangement of resources for the information management system of FIG. 1, including information management cells.

FIG. 3 shows a hierarchical arrangement of resources that may form an information management system 150. As shown, the information management system 150 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
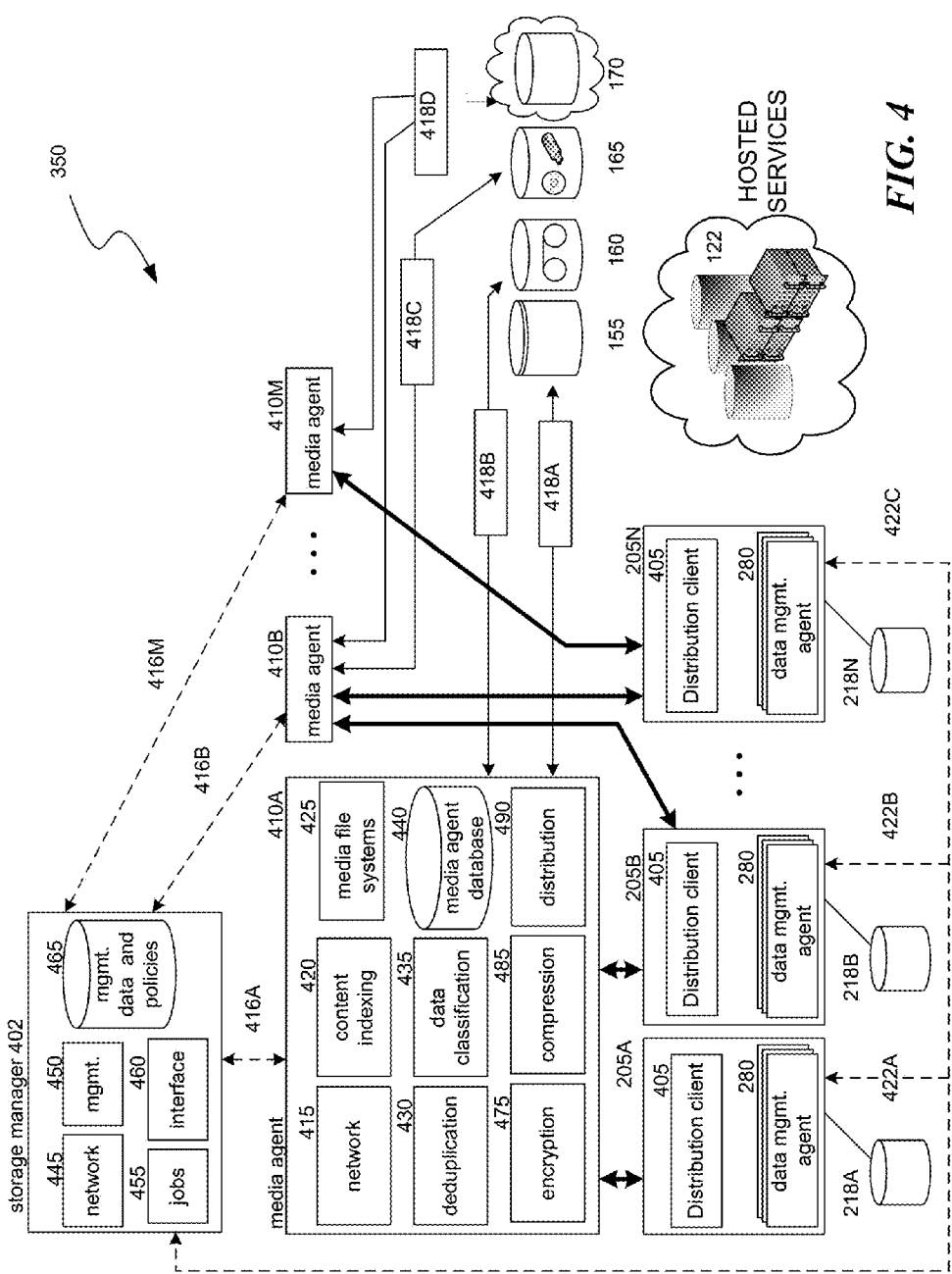
FIG. 4 is a block diagram illustrating an example of resources forming an information management cell.

FIG. 4 shows an arrangement of resources that may form an information management cell 350. As shown, the information management cell includes a storage manager 402, one or more media agents 410A-M, one or more non-production storage mediums 155-870, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350 (or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies,"

which are generally data structures or other information sources that each include a set of criteria and rules associated with performing an information management operation. The criteria may be used to determine which rules apply to a particular data object, system component, or information management operation, an may include:

frequency with which a production or non-production copy of a data object or metadata has been or is predicted to be used, accessed, or modified;

access control lists or other security information;

the sensitivity (e.g., confidentiality) of a data object as determined by its content and/or metadata;

time-related factors;

deduplication information;

the computing device, hosted service, computing process, or user that created, modified, or accessed a production copy of a data object; and an estimated or historic usage or cost associated with different components.

The rules may specify, among other things:

a schedule for performing information management operations, a location (or a class or quality of storage media) for storing a non-production copy, preferences regarding the encryption, compression, or deduplication of a non-production copy, resource allocation between different computing devices or other system components (e.g., bandwidth, storage capacity), whether and how to synchronize or otherwise distribute files or other data objects across multiple computing devices or hosted services, network pathways and components to utilize (e.g., to transfer data) during an information management operation, and retention policies (e.g., the length of time a non-production copy should be retained in a particular class of storage media).

As noted above, each computing device 205 may include one or more data management agents 280. Each data management agent is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-870. Each media agent 410 may control one or more intermediary storage devices 418, such as a cloud server or a tape or magnetic disk library management system, to read, write, or otherwise manipulate data stored in a non-production storage medium 155-870. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other. The functions performed by the distribution module are described in greater detail herein.

Suitable Computer Networks

As previously discussed, the presently disclosed techniques allow shared access to a SAN storage device. Briefly and in general terms, using the disclosed techniques, multiple media agents, which may be implemented using different operating systems, can transfer data to/from the same SAN Storage server simultaneously over a high-speed connection such as a Fibre Channel. In some implementations, storage read/write data therefore does not flow on the LAN.

In on aspect, the use of an access media agent allows concurrent access to a storage device from multiple media agents. In another aspect, storage capacity can be added to the storage device, without the media agents having to provision for the added storage capacity, as would have to be done without the access media agent.

Figure 5:
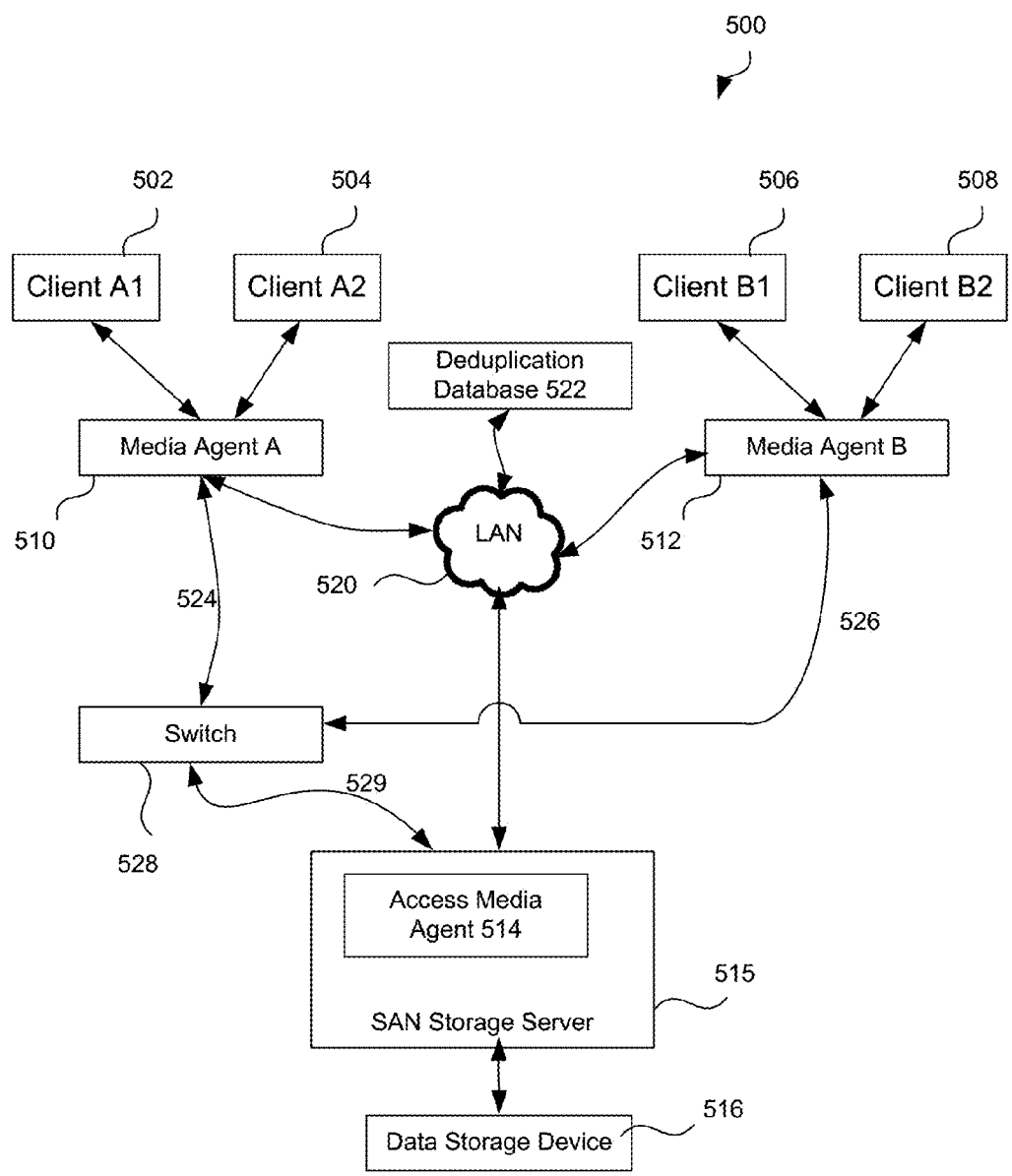
FIG. 5 is a block diagram depicting an example computer network.

FIG. 5 depicts an example computer network 500 that includes a shared data storage device 516. Various data storage devices 516, e.g., magnetic or optical media based storage devices, are well known in the art and a detailed description of storage technologies is omitted from this document for brevity. While the data storage device 516 is shown external to the SAN Storage Server 515, in various embodiments, the data storage device 516 may be external (e.g., connected over a peripheral data bus) or internal (e.g., a hard drive installed in the chassis of the SAN Storage Server 515. Other configuration of storage devices are well known in the art. Because the storage device 516 is accessible by other entities in the computer network 500, it is beneficial to allow shared access to the storage device 518 by multiple clients (e.g., user computers, applications needing data storage access, etc.) In some configurations, multiple media agents provide data storage services to the clients. For example, a media agent 510 may be connected to multiple clients 502, 504. Similarly, another media agent 512 may be connected to a distinct set of one or more clients 506, 508, and so on. Media agents 510, 512 may in turn be communicatively coupled with a deduplication database 522 over a network 520. The network 520 may, e.g., be a corporate local area network (LAN) 520 such as the Ethernet.

Network-attached data storage devices (NAS) that are attachable to a LAN using, e.g., a Gigabit Ethernet connection, are well known in the art. However, in such networks, data transfers between media agents 510, 512 and the data storage device 516, typically uses the same LAN bandwidth that is shared with other data traffic on the network. Such configurations may suffer from the drawback that the data read/write operations travel over the LAN (e.g., network 520) and compete for resources with other data traffic, thereby impacting the performance of the LAN 520.

In some implementations, media agents 510, 512 may be configured to access data storage devices over dedicated data interfaces such as SCSI, SATA, IDE, SAS, etc., which are well known in the art. However, when a data storage device is accessible using such a dedicated data connection, two or more servers cannot simultaneously look at the data storage device as a target. Allowing two or more servers to read/write to the storage device over the same dedicated interface may result, e.g., in data corruption because the two or more servers may end up writing data to the storage device in the same locations.

The above-discussed operational issues can be addressed, in one aspect, by using an intermediate Access Media Agent 514 that controls or arbitrates the access by multiple media agents 510, 512 to the data storage device 516. The access media agent 514 may be coupled to multiple media agents 510, 512 over their respective dedicated data interfaces 524, 526 such as a Fibre Channel SCSI interface. The interfaces 524, 526 may possibly be routed to the Access Media Agent 514 through a switch 528 (e.g., a Fibre Channel switch). In some implementations, the Access Media Agent 514 may be a software application running on a SAN storage server 515 platform. The SAN storage server 515 may also be coupled to the LAN 520. In one aspect, the Access Media Agent 514 may control the SAN storage server 515 to look like a SCSI target to each media agent 510, 512, for their respective data transfers to/from the data storage device 516. In other words, the Access Media Agent 514 may provide, in one aspect, an abstraction layer or a virtualization layer, by which the media agents 510, 512 can share the SCSI interface to the data storage device 516, with the Access Media Agent 514 controlling or arbitrating the access by each media agent to ensure no data corruption takes place. Several possible embodiments of the Access Media Agent 514 are further described below.

Access Media Agent

As previously described, in one aspect, the Access Media Agent 514 may allow multiple media agents to simultaneously transfer data to the storage device 516 over a dedicated data connection such as a Fibre Channel, without having any of the data to be stored flow over the LAN 520. The media agents 510, 512 may be implemented to operate with any Operating System (OS) and the Access Media Agent 514 functionality may thus be transparent to the media agents 510, 512 regardless of implementation details of the operating systems. By providing such an abstraction layer, in one aspect, the Access Media Agent 514 relieves the media agents 510, 512 of having to provision any changes to the data storage device 516 (e.g., addition of storage capacity, etc.). Furthermore, in another aspect, the data storage device 516 may be coupled to the SAN storage server 515 externally, by connecting to the SAN storage server 515 using a transport type such as parallel SCSI, SAS, IDE or SATA, which may be available to the other media agents 510, 512 via a variety of packet delivery frameworks.

In some implementations, the Access Media Agent 514 may be implemented on the SAN storage server 515 as a Linux application. The Linux platform executing on the SAN storage server 515 may be based on, e.g., Red Hat Enterprise Linux 6 release. A socket framework, further described below, may be used for data delivery. The use of a socket layer interface, in one aspect, allows for code reuse by relying on the mechanism of maintaining data buffers at the kernel level by sharing the data buffers with application layer, as is further described below.

The data delivery over the Fibre Channel 529 may be performed using a connection-less protocol such as the User Datagram Protocol (UDP). The UDP framework, in one aspect, allows for an easy mix-and-match of media agents 510, 512 that use OS such as Linux, AIX, Solaris, Windows, HP-Unix and so on. In another aspect, the UDP framework allows re-use of code that may be used for sharing storage devices over a LAN connection such as a network-attached storage framework. In some implementation, an application layer packet-retry mechanism may be implemented to improve reliability of data transmissions.

In some implementations, the SAN storage server 515 may include a Fibre Channel Host Bus Adapter (HBA) such as a product from QLogic, Emulex or LSI Logic. Each server hosting a media agent may be fitted with at least one Fibre Channel HBA. The HBA installed in the SAN storage server 515 may be adapted to initialize in SCSI target mode. Such a behavior of the HBA may be accomplished by modifying the Linux protocol stack on the SAN storage server 515. For greater throughput, the modification may be done at the kernel level (in-kernel modification) instead of an application layer level modification ("user land modification"), as further described below.

Some implementations of the SAN storage server 515 may use SCSI Target Subsystem (SCST), which is a robust open source implementation of Target Mode SCSI. In one aspect, the SCST is beneficial because it provides device-independent Target Mode SCSI operation, leaving device-dependent detail to be implementation-specific. The term "device handler" is often used to refer to the device-dependent functionality. As described below, some implementations of the Access Media Agent 514 may use a virtual disk device handler that controls the lower level detail of mapping data transfers to storage device locations.

Figure 6:
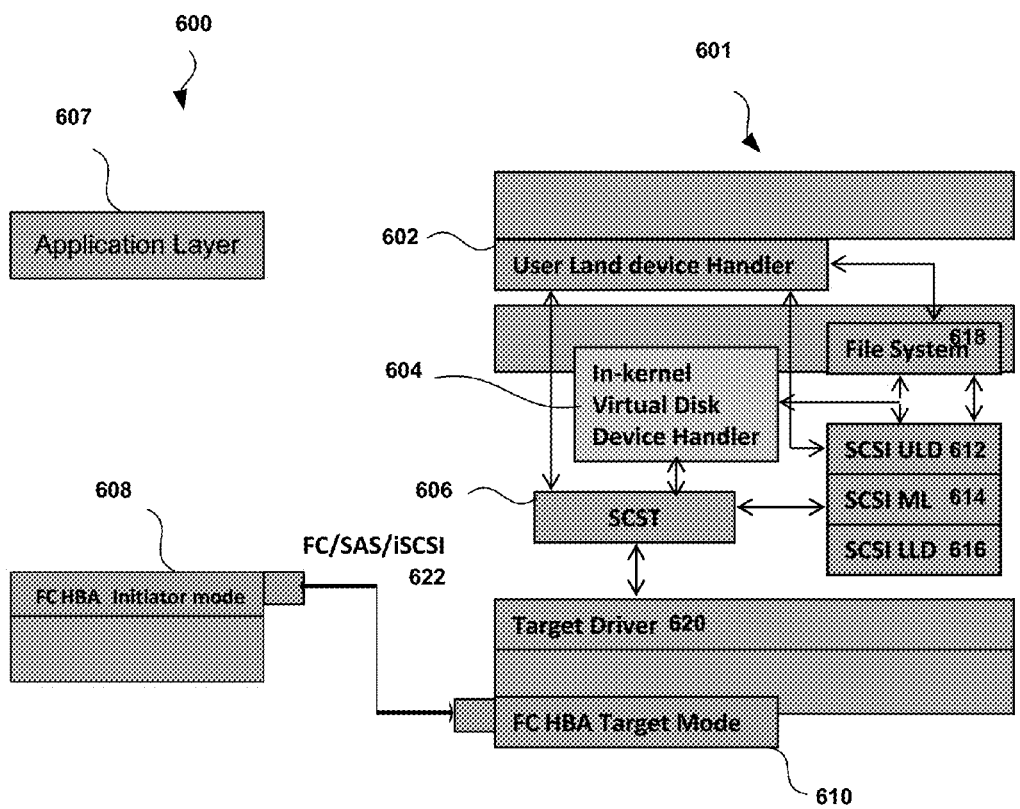
FIG. 6 is an architectural block diagram of a small computer system interface (SCSI) Target Subsystem (SCST).

FIG. 6 is an architectural block diagram showing interaction between the protocol stack 600 implemented in a media agent 510, 512 and the protocol stack 602 implemented in the SAN storage server 515. The two protocol stacks 600, 601 communicate with each other over a Fibre Channel, SAS, iSCSI or other interface 622.

On the media agent 510, 512, the protocol stack 600 includes an upper layer (application layer) 607 and a kernel level protocol layer 608 that includes a module configured to operate in the Fibre Channel (FC) Host Bus Adapter (HBA) initiator mode (e.g. operating on the client side). The kernel level protocol layer 608 is communicatively coupled with a module 610 in the protocol stack 601 configured to operate in the FC HBA Target Mode (e.g. on the SAN storage server). In the protocol stack of the target mode device (e.g., SAN storage server 515), a Target Driver 620 is in communication with an SCST upper layer 606. The SCST 606 in turn interfaces with an upper layer in-kernel virtual disk device handler module 604 and a User Land Device Handler module 602. The file system 618 and the SCSI Upper Layer Driver module 612, a SCSI middle layer module 614 and a SCSI low layer driver module 616 are provided on the Target Mode device and are in communication with the SCST 606 and the User Land Device Handler 602 which operates at the application layer.

As depicted in FIG. 6, and previously described, the SCST 606 thus provides target mode functionality while providing a level of abstraction between target device drivers and the in-kernel virtual disk device handler, described below.

Suitable Protocol Stack

Figure 7:
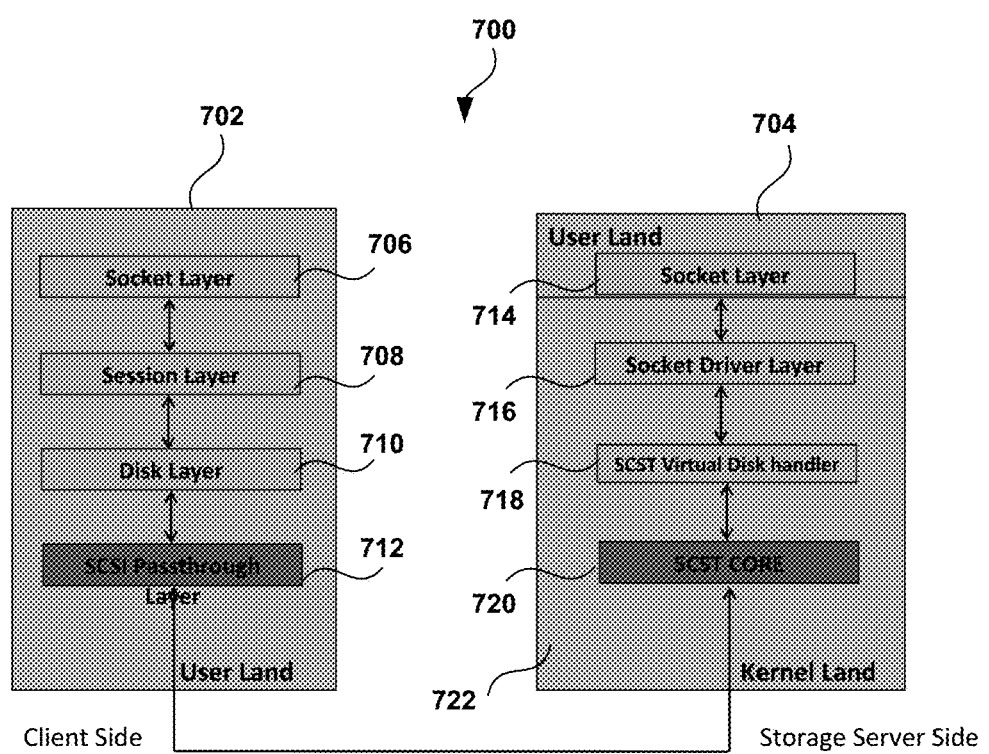
FIG. 7 is a pictorial depiction of protocol stacks implemented in a client and a server.

FIG. 7 is a pictorial depiction of protocol stacks implemented at either ends of a SCSI connection. In operation, the client-side 702, which may act as a SCSI source, may be implemented at media agents 510, 512 and the server-side 704, which may act as a SCSI target, may be implemented at the access media agent 514. At the client-side 702, the protocol layer modules include, among others, a socket layer module 706, a session layer module 708, a disk layer module 710 and a SCSI pass-through layer module 712. The SCSI pass-through layer module 712 is in turn configured to communicate with an SCST core module 720, which is in the kernel space 722 on the storage server-side 704. The SCST core 720 is in communication with a SCST virtual disk handler module 718 (which may be similar to module 604 in FIG. 6), a socket driver layer module 716 and a socket layer module 714 that interfaces with the user space (user land) 704.

Figure 8:
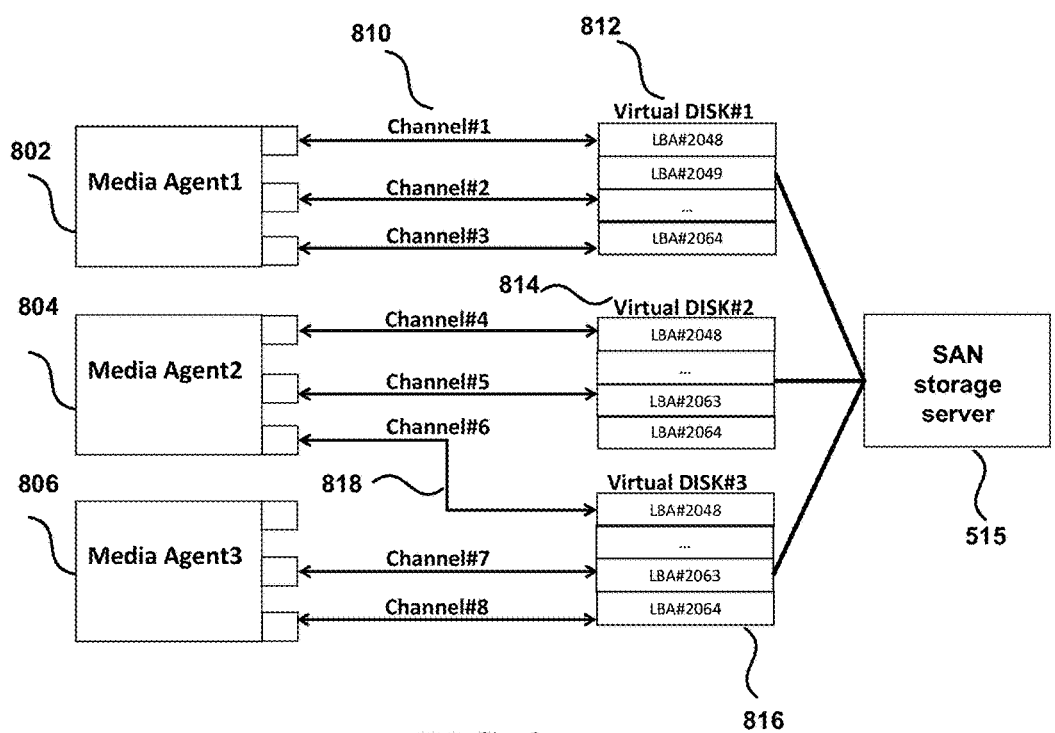
FIG. 8 is an architectural block diagram of a system for allowing simultaneous access to a shared Storage Area Network (SAN) server by multiple media agents.

FIG. 8 is an architectural block diagram of a system for allowing simultaneous access to a shared Storage Area Network (SAN) server by multiple media agents. Media agents 802, 804, 806 (similar to the previously described media agents 510, 512) share storage across their SCSI interfaces via communication with a SAN storage server 515. Each media agent 802, 804, 806 may be implemented in a different OS (e.g. Linux, Windows, etc.), and be configured to operate with one or more channels of communication 810, which are in turn communicating with the shared SAN server 808 through individual Logical Block Addresses from a virtual disk connection 812. In other words, to each media agent 802, 804, 806, the shared SAN server makes the storage appear to be a "virtual disk" 812, 814, 816 respectively. Thus, the media agent 802 is able to read/write data using one or more channels and one or more LBAs to its virtual disk 812, and so on.

A channel 810 may be a logical connection through which packet delivery is achieved between a media agent 510, 512 and the access media agent 514. A channel 810 may represent the combination of a Logical Unit Number (LUN) and a Logical Block Address (LBA) that makes the channel identification unique within a combination of the media agents and the access media agent in a given computer network. Each channel 810 may be full duplex in nature. In some implementations, socket interface API is used for data transfers over a channel, thereby abstracting the internal details about channel management and data transfer.

In some implementations, the combination of a channel and LBA may represent a unique access resource. Therefore, it may be possible that two separate media agents (e.g., 804, 806) share a same virtual disk (e.g., 816), via different channels, as depicted e.g., by channel 818.

FIG. 9 is tabular representation 900 of an example storage resource assignment to multiple media agents. A channel number is assigned for a combination of a media agent identity, a virtual disk provided or exported by the shared SAN server 808, and LBA numbers for the channel listed in the same row in the table. Note that it is possible to use the same LBA numbers on two different channels when virtual disks differ. The access media agent 514 may maintain the table 900 such that, during operation, the access media agent 514 is able to individual control and track data transfer operations of the media agents 510, 512 to/from the storage device 516.

It will be appreciated that, in one aspect, the virtualization performed by the media access agent may make the same storage device appear to have distinct Logical Unit Numbers (LUNs) to different data sources (e.g., media agents 510, 512). Furthermore, these LUNs may be different from the LUN used by the access media agent 514 to access the storage device 516 over its local data interface. The access media agent tracks or translates such LUNs to implement the above functionality.

Figure 10:
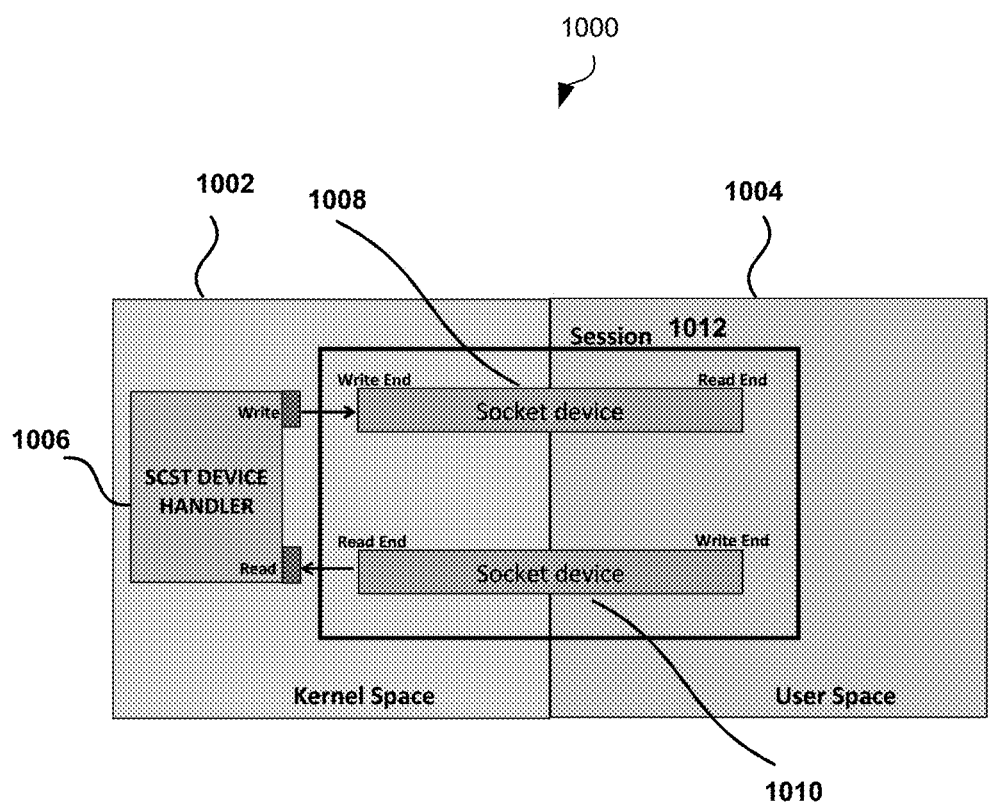
FIG. 10 is a block diagram representation of interaction between Kernel space and User space in a storage system.

FIG. 10 is a block diagram representation of the operation of the protocol stack 1000 implemented in a SAN storage server 515, e.g., as a part of the Access Media Agent 514. Computer platforms typically run operating systems (e.g., Linux) in which peripheral support (e.g., SCSI driver) is provided in code modules that are a part of the kernel space. The protocol stack 1000 may therefore be logically partitioned as the kernel space 1002 (e.g., representing code base that cannot be easily changed by application layer programming) and user space 1004 (e.g., application layer code that can be changed by a programmer) in a storage system server such as the SAN storage server 515. During operation, a session 1012 may be established for managing connectivity with a SCSI source (e.g., media agent 510, 512). The session 1012 may include socket interfaces between the kernel space and the user space for data read/writes as follows. The SCST Device Handler module 1006, which may be in the kernel space 1002, may provide read/write access to data transfers to/from the media agent 510, 512 to the user space application running as a part of the Access Media Agent 514. During the life of a session 1012, the data read/writes are performed, e.g., by opening a socket device interface to read (1010) or write (1008) between kernel space and user space, as is well known in the Linux operating system. Referring back to the table 900 in FIG. 9, each tow of the table may correspond with a corresponding session established between the respective media agent and the Access Media Agent 514.

In a SCSI implementation, when the access media agent 514 receives an INQUIRY command descriptor block (CDB) for reading Vital Product Data (VPD) page 0x83, the access media agent 514 may report a new vendor ID. For example, disk vendor may be identified as CVLT_FIO for access media agent 514 implementations by CommVault. Furthermore, a response, which includes the host name of the access server, may be provided to an INQUIRY message received to read VPD Page 0xC0. In some implementations, the combination of the disk vendor name and the host name may be used to uniquely identify the storage device 516 made available for storage access. For example, one data storage device may be identified as "Western Digital Disk 0x0F on Server XYZ" while another storage device may be identified as "Seagate Disk 0x0F on Server ABC," and so on.

Figure 11:
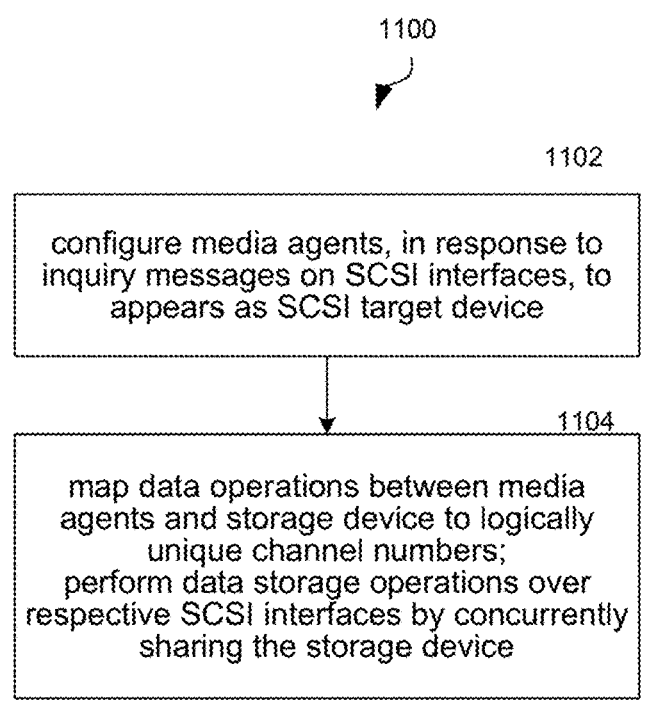
FIG. 11 is a flow chart representation of a process of allowing simultaneous access by multiple media agents to a shared storage.

FIG. 11 is a flow chart representation of a process 1100 of providing shared access over a Fibre Channel SCSI interface to a storage device in a computer network. In some implementations, the process 1100 may be implemented at the above-described SAN storage server 515. At 1102, an operational mode is provided on SCSI interfaces with a first media agent and a second media agent such that, in response to inquiry messages on the SCSI interfaces, the storage device is made to appear as a SCSI target device to the first media agent and the second media agent. As previously discussed, this may be accomplished by modifying kernel of an off-the-shelf Linux OS protocol stack. At 1104, data operations between the first media agent and the storage device and the second media agent and the storage device may be mapped to logically unique channel numbers for the first and the second media agents to perform data storage operation over their respective SCSI interfaces by concurrently sharing the storage device.

As previously described, the use of logically unique channel numbers by the Access Media Agent 514 at the SAN storage server 515, in one advantageous aspect, simplifies the task of uniquely identifying source of a data transfer with the sector on the storage device 516 where the data is stored. In some implementations, the Access Media Agent may arbitrate access to the shared data storage 516 by enforcing operator rules related to how much storage capacity to expose to which media agent 510, 512 and read-write speeds to be offered to various media agents. For example, one operator-enforced rule may grant a greater portion of all available storage capacity to a media agent that is handling critical backup operations. Furthermore, in some implementations described above, because data transfers are exposed to the application layer at the SAN storage server 515, data may be encrypted en route the storage device 516 and correspondingly decrypted when read back from the storage device 516. The encryption may use, e.g., different encrypted keys that are based on a corresponding channel 810 on which the data is transferred.

Figure 12:
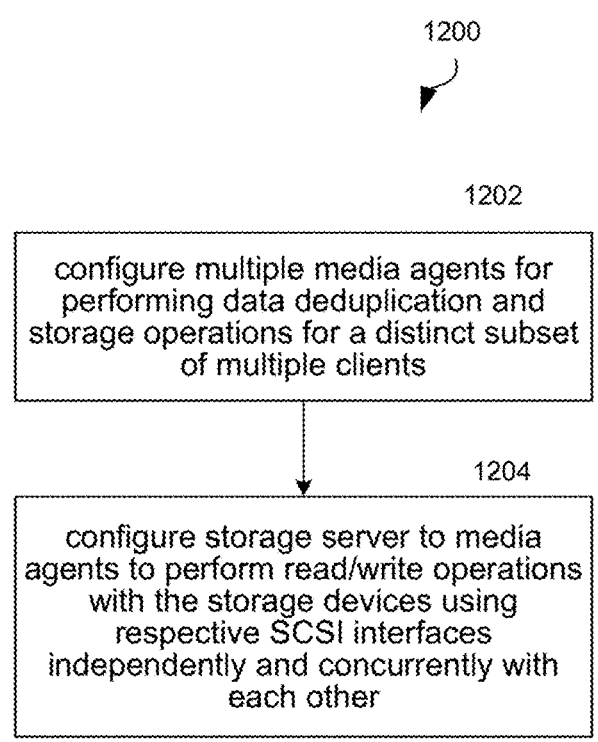
FIG. 12 is a flow chart representation of a process of sharing a SCSI data storage device among multiple client computers.

FIG. 12 is a flow chart representation of a process 1200 for sharing a storage device among multiple clients in a computer network system comprising multiple clients and the storage device. At 1202, multiple media agents are provided. Each media agent is configured for data deduplication and storage operations for a distinct subset of multiple clients. At 1204, a storage server (e.g., the SAN storage server 515) is configured to control access by multiple media agents to the storage device such that multiple media agents are able to perform read/write operations with the storage device using SCSI interfaces that operate independently of each other and concurrently with each other. In some implementations, an Access Media Agent running on the storage server may optionally provide a mapping between the channel numbers used by multiple media agents for data operations over the respective SCSI interfaces and the corresponding channel numbers over a local interface between the storage server and the storage device.

The Access Media Agent 514 may further perform load balancing between various media agents 510, 512 by keeping track of demand for storage capacity by each media agent 510, 512. It would be appreciated that, in some implementations, the Access Media Agent 514, is able to provide simultaneous read access to the same data block stored in the storage device 516 by simply transferring the data block multiple times over the SCSI connection to the media agents 510, 512.

It will be appreciated that the system described herein includes a centralized server that arbitrates shared data storage, e.g., a storage area network (SAN), by exposing to media agents a common pool of data storage devices as logical units. The centralized server eliminates the need for provisioning storage devices to individual media agents or application servers. The centralized server traps and responds to discovery requests from media agents by employing a virtualization layer implemented as a shared access media agent. The centralized server and access media agent also arbitrates read/writes to shared data storage devices to permit concurrent data access of the shared storage devices.

It will also be appreciated that the disclosed techniques, in one aspect, allow for multiple media agents, possibly implemented using different operating systems, to simultaneously transfer data to/from a storage area network (SAN) storage server over Fibre Channel. It will further be appreciated that the data transfer may be performed without using a local area network (LAN).

It will further be appreciated that techniques are provided that, in one aspect, allow simultaneous access by multiple servers, to a data storage device over a data transfer interface such as a SCSI, ATA, IDE or SAS interface, which in conventional art can only act as a target device for data transfers with a single server. In one aspect, the disclosed technique provide the advantage that each server need not have to incur the computational overhead of having to manage details such as where on the storage device to store data, data capacity available on the storage device, and so on.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, smart phones, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain examples are presented below in certain forms, the applicant contemplates the various aspects of the invention in any number of claim forms. Accordingly, the applicant reserves the right to add additional claims after filing the application to pursue such additional claim forms for other aspects of the invention.

The invention claimed is:

1. A system, comprising:
multiple media agents, each media agent associated with a client device and configured to perform data storage operations for the client device,
  wherein the multiple media agents are configured to perform data storage operations with a storage device using dedicated data interfaces; and
at least one hardware processor having an access media agent that is configured to control access to the storage device by the multiple media agents,
  wherein the access media agent is coupled to the multiple media agents over the dedicated data interfaces, and
  wherein the media access agent is further configured to map channel numbers, used by the multiple media agents for data operations over respective dedicated data interfaces, to corresponding channel numbers of a local interface between a storage server, that includes the access media agent, and the storage device.

2. The system of claim 1, wherein the multiple media agents each employ logically unique channel numbers to perform data storage operations over the respective dedicated data interfaces.

3. The system of claim 1, wherein the dedicated data interfaces are SCSI interfaces.

4. The system of claim 1, wherein the access media agent is part of a storage area network (SAN) server, and controls the SAN server to appear as a SCSI target to the multiple media agents.

5. The system of claim 1, wherein a first media agent of the multiple media agents is implemented using a first operating system, and a second media agent of the multiple media agents is implemented using a second operating system different from the first operating system.

6. The system of claim 1, wherein the data storage operations are performed using Universal Datagram protocol (UDP).

7. The system of claim 1, wherein at least one media agent of the multiple media agents is connected to a deduplication database,
  wherein the deduplication database is configured to communicate with the at least one media agent over a deduplication interface that is different from the dedicated data interfaces.

8. The system of claim 1, wherein the storage device is a network-attached data storage device (NAS).

9. The system of claim 1, wherein the access media agent provides an abstraction layer within a storage area network (SAN) server that accesses the storage device.

10. The system of claim 1, wherein the dedicated data interfaces are Fibre Channels.

11. A method for providing multiple media agents with shared access over a Fibre Channel small computer system interface (SCSI) interface to a storage device in a computer network, the method comprising:
providing an access media agent in communication with a first media agent and a second media agent over one or more SCSI interfaces,
  wherein the first media agent and the second media agent are configured to perform data storage operations associated with the storage device for one or more client devices,
  wherein the access media agent is located at a storage area network (SAN) server configured to arbitrate access to the storage device by the first media agent or the second media agent, and
  wherein the access media agent is configured to control the SAN sever to appear as a SCSI target to both the first media agent and the second media agent; and
mapping, via the access media agent, data storage operations between the first media agent and the storage device and data storage operations between the second media agent and the storage device; and
perform data storage operations over respective SCSI interfaces by concurrently sharing the storage device with the first media agent and the second media agent;
  wherein mapping data storage operations between the first media agent and the storage device, and data storage operations between the second media agent and the storage device, includes mapping channel numbers, used by the first media agent and the second media agent for data storage operations over the one or more SCSI interfaces, to corresponding channel numbers over a local interface between the SAN server and the storage device.

12. The method of claim 11, further comprising:
providing a deduplication database in the computer network, wherein the deduplication database is configured to communicate with the first media agent and the second media agent over a deduplication interface that is different from the one or more SCSI interfaces.

13. The method of claim 11, further comprising:
adding storage capacity to the storage device; and
providing the added storage capacity to the first media agent and the second media agent without having to provision the added storage capacity on the first media agent and the second media agent.

14. The method of claim 11, wherein the first media agent and the second media agent are implemented using different operating systems.

15. The method of claim 11, wherein the data storage operations are performed using Universal Datagram protocol (UDP).

16. A non-transitory computer-readable medium whose contents, when by a computing system, cause the computing system to perform a method of providing multiple media agents with shared access over a small computer system interface (SCSI) interface to a storage device in a computer network, the method comprising:
  coupling a first media agent and a second media agent to an intermediate media agent over respective SCSI interfaces to cause the storage device to appear as a SCSI target device to the first media agent and the second media agent,
    wherein the intermediate media agent is located at a storage area network (SAN) server associated with the storage device, and
    wherein the first media agent and the second media agent are configured to access the storage device during data storage operations performed for one or more client devices associated with the first media agent or the second media agent; and
  controlling access, via the SAN server, to the storage device for the first media agent and the second media agents;
    wherein the first media agent is associated with a first logically unique channel number;
    wherein the second media agent is associated with a second logically unique channel number; and
    wherein the first media agent and the second media agent perform the data storage operations over respective first and second SCSI interfaces, in part, based on the first and second logically unique channel numbers.

17. The non-transitory computer-readable medium of claim 16, wherein the first media agent and the second media agent are implemented using different operating systems.

18. The non-transitory computer-readable medium of claim 16, wherein the storage device is a network-attached data storage device (NAS).

* * * * *